(12) United States Patent
Beele

(10) Patent No.: US 7,005,579 B2
(45) Date of Patent: Feb. 28, 2006

(54) BUSHING

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 6 days.

(21) Appl. No.: 10/432,568

(22) PCT Filed: Nov. 20, 2001

(86) PCT No.: PCT/NL01/00841

§ 371 (c)(1),
(2), (4) Date: Oct. 10, 2003

(87) PCT Pub. No.: WO02/43212

PCT Pub. Date: May 30, 2002

(65) Prior Publication Data

US 2004/0049881 A1    Mar. 18, 2004

(30) Foreign Application Priority Data

Nov. 24, 2000  (NL)  .................................. 1016703

(51) Int. Cl.
*H02G 3/18* (2006.01)

(52) U.S. Cl. ................. 174/65 G; 174/152 G; 174/153 G; 16/2.1; 16/2.2; 248/56

(58) Field of Classification Search ............. 174/65 G, 174/153 G, 152 G, 72 A, 135, 91, 92, 97, 174/142, 152 R, 155, 156, 48; 16/2.1, 2.2; 248/56; 439/604, 587; 277/314, 330, 590, 277/602

See application file for complete search history.

(56) References Cited

U.S. PATENT DOCUMENTS

| | | | | |
|---|---|---|---|---|
| 3,056,852 A | * | 10/1962 | Sachs | ..................... 174/153 G |
| 3,678,535 A | * | 7/1972 | Charles | ........................ 16/2.1 |
| 4,089,496 A | * | 5/1978 | Mizusawa | ..................... 248/56 |
| 4,309,007 A | * | 1/1982 | Logsdon | ..................... 248/56 |
| 4,677,253 A | * | 6/1987 | Blomqvist | ..................... 174/48 |
| 4,702,444 A | * | 10/1987 | Beele | ..................... 248/56 |
| 4,797,513 A | * | 1/1989 | Ono et al. | ............. 174/153 G |

(Continued)

FOREIGN PATENT DOCUMENTS

DE          43 40 343          3/1995

(Continued)

OTHER PUBLICATIONS

International Search Report dated Feb. 28, 2002, for application PCT/NL01/00841.

*Primary Examiner*—Angel R. Estrada
(74) *Attorney, Agent, or Firm*—Patterson & Sheridan, LLP

(57) ABSTRACT

A system for passing a cable, a conduit, a pipe or the like sealingly through an opening in a wall, comprising a sealing device made of an elastic material, such as rubber, which includes at least one lead-through channel having a smooth inner wall, wherein the sealing device is externally provided with axially spaced-apart, circular, at least substantially inflexible, compressible ribs lying in (imaginary) radial planes, whose outside diameter is larger than the inside diameter of the opening, and wherein the system furthermore includes at least one grommet to be fitted round the cable, the conduit, the pipe or the like that is to be passed through, which grommet can be fitted sealingly in said lead-through channel, which grommet, which has a smooth outer side, includes a bore whose wall is provided with axially spaced-apart, circular, at least substantially inflexible, compressible ribs lying in (imaginary) radial planes, whose inside diameter is at least substantially identical to the outside diameter of the cable, the conduit, the pipe or the like that is to be passed through.

7 Claims, 1 Drawing Sheet

U.S. PATENT DOCUMENTS

| | | | | |
|---|---|---|---|---|
| 4,919,372 A | * | 4/1990 | Twist et al. | 248/56 |
| 5,108,060 A | * | 4/1992 | Beele | 248/56 |
| 5,811,728 A | * | 9/1998 | Maeda | 174/65 R |
| 6,521,840 B1 | * | 2/2003 | Kreutz | 174/151 |
| 6,627,817 B1 | * | 9/2003 | Kortenbach | 174/65 G |
| 6,717,055 B1 | * | 4/2004 | Kato | 174/72 A |

FOREIGN PATENT DOCUMENTS

| | | | |
|---|---|---|---|
| EP | 278544 A1 | * | 8/1988 |
| EP | 0 404 266 | | 3/1993 |
| GB | 2 186 442 | | 8/1987 |
| GB | 2204922 A | * | 11/1988 |

* cited by examiner

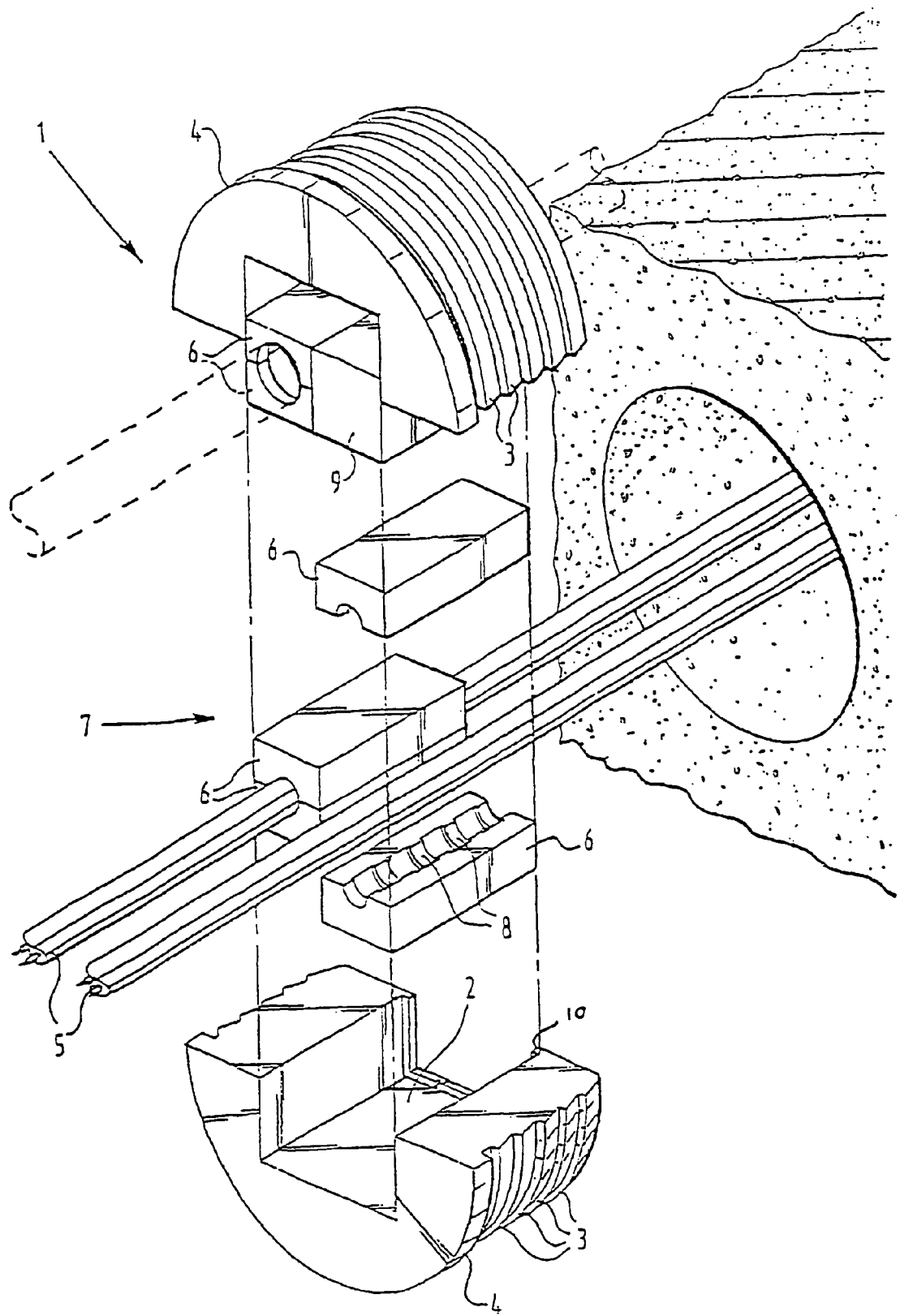

BUSHING

The invention relates to a system for passing a cable, a conduit, a pipe or the like sealingly through an opening in a wall, comprising a sealing device made of an elastic material, such as rubber, which includes at least one lead-through channel having a smooth inner wall, wherein the sealing device is externally provided with axially spaced-apart, circular, at least substantially inflexible, compressible ribs lying in (imaginary) radial planes, whose-outside diameter is larger than the inside diameter of the opening, and wherein the system furthermore includes at least one grommet to be fitted round the cable, the conduit, the pipe or the like that is to be passed through, which grommet can be fitted sealingly in said lead-through channel. It is noted in this connection that the term "wall" is understood to include a wall, a partition, a ship's deck, in short, any partition for sealed passage therethrough of a cable, a conduit, a pipe or the like.

Such a system is known from European patent no. 0 278 544 in the name of the present applicant. The known system provides a cylindrical sealing device, which comprises a number of eccentrically disposed cylindrical lead-through channels, as well as an identical number of grommets, which must each be inserted into a corresponding lead-through channel. Each grommet consists of several segments having a smooth inner side and being provided with so-called ridges on the outer side, which are to be arranged around single cables passing through. Not only will the segments sealingly press on the electrical cables passing through when a grommet is being forced into a lead-through channel, but also the ridges and the smooth inner wall of the lead-through channel will be squeezed together sealingly.

One drawback of the system as known from the aforesaid European patent is that leakage sometimes develops in practice, in particular between the smooth inner side of the grommet and the more or less smooth outer surface of the electrical cables passing through, since the diameter of the cables passing through may vary owing to production tolerances; said tolerance differences cannot easily be compensated by the material of the grommet and/or the cables.

The object of the invention is to provide a sealing system which provides an improved sealing result, wherein no leakage will occur.

In order to accomplish that objective, a system of the kind referred to in the introduction is characterized in that said grommet, which has a smooth outer side, includes a bore whose wall is provided with axially spaced-apart, circular, at least substantially inflexible, compressible ribs lying in (imaginary) radial planes, whose inside diameter is at least substantially identical to the outside diameter of the cable, the conduit, the pipe or the like that is to be passed through. Since the inside diameter of the (inner) ribs Is preferably larger than the outside diameter of the cable, the conduit, the pipe or the like passing through, said ribs will be slightly compressed during use, as a result of which a pressure-resistant seal is formed on the outer surface of the cable, the conduit, the pipe or the like passed through, thus preventing leakage along said outer surface—also in the case of tolerances in the cable diameter. At the same time, the smooth inner wall of the bushing and the smooth outer surface of the grommet squeeze against each other sealingly.

In one preferred embodiment of a system according to the invention, the lead-through channel is of at least substantially rectangular or square cross-section. This makes it possible in particular to use a grommet which comprises a parallelopiped block formed of two identical halves, which halves can be fitted round the cable, the conduit, the pipe or the like to be passed through.

In another preferred embodiment of a system according to the invention, the smooth inner wall of the lead-through channel abuts against the smooth outer wall of the grommet in the position of use. Preferably, at least two grommets are used, which can be fitted sealingly in the lead-through channel. One of said grommets may be a blind grommet, if part of the lead-through channel is not being used and needs to be closed, therefore.

The invention furthermore relates to a bushing and/or a grommet apparently suitable for use in a system according to the invention.

The invention will now be explained in more detail with reference to a FIGURE that is shown in a drawing, which schematically shows a preferred variant of a system according to the invention in perspective view. The figure shows a cylindrical sealing device 1 having a smooth, rectangular lead-through channel 2. This sealing device is externally provided with serrated, in cross-sectional view, outer ribs 3 lying in (imaginary) radial planes, which are inflexible, practically speaking, but which are substantially compressible. In order to facilitate the insertion of the sealing device 1 into a wall opening, vaseline or another lubricant may be applied to the outer ribs 3 before said insertion takes place. Insertion takes place over a distance defined by a flange 4 abutting against the edge of a wall opening. In order to prevent the sealing device 1 from being forced out of a wall opening too easily, the outer ribs 3 are serrated, seen in cross-sectional view. In order to obtain a pressure-resistant, gastight, watertight and fireproof seal, the outside diameter of the outer ribs 3 must be larger than the inside diameter of a wall opening to be sealed. In practice, the bottom side and the flange side of the sealing device 1 have a pressure resistance of, respectively, 1 bar and 2 bar. Once the sealing device 1 has been pressed into a wall opening, the electricity cables 5 can be passed through the lead-through channel 2. Following that, two identical block halves 6 of a block-shaped cable grommet 7 must be fitted round an electric cable 5 and subsequently be inserted into the lead-through channel 2, which can be done by means of a mallet. The inner ribs 8 of trapezoidal cross-section that are present on the inner side of the cable grommet 7 have an inside diameter which is larger than the outside diameter of the electric cable 5 in question that is to be passed through. When the cable grommets 7 are inserted into the lead-through channel 2, this will not only cause the block halves 6 to press sealingly on the respective electric cable 5 that is to be passed through, but the smooth outer sides of the grommets 7 (block halves 6) 8 and the inner wall of a lead-through channel 2 will also be squeezed together sealingly. An unused part of the lead-through channel 2 of the sealing device 1 may be closed by, for example, a blind grommet 9 comprising two identical block halves. In the position of use, a sealing pressure will be obtained between the outer sides of adjacent, block-shaped grommets 7 and between the walls of their bores and the outer sides of cables 5 present therein, and also between the outer sides of the block-shaped grommets 7 and the inner wall of the lead-through channel 2, such that leakage will not occur in practice. On the rear side of the lead-through channel 2, each half of the sealing device 1 is provided with a bumper edge 10 to prevent the block halves 6 being inserted too far.

The possibility to fit several block-shaped grommets 7 having mutually different bore diameters in the rectangular lead-through channel 2 provides much greater flexibility in passing through cables 5 having mutually different diameters than is possible with the system according to the aforesaid European patent publication no. 0 278 544; after all, said prior art bushing comprises a fixed pattern of identical lead-through channels. In addition, said identical lead-through channels need to be spaced a minimum distance apart in order to impart some rigidity to the known bushing, with the inherent drawback that the known bushing takes up a relatively great deal of space. Finally, because the aforesaid prior art sealing device is made in one piece, it cannot be used with cables that are in place already; with the sealing device 1 according to the invention, on the other hand, this is possible, since it comprises two identical halves.

The invention is not restricted to the preferred variant as shown, but also other embodiments can be realised without departing from the scope of the invention as defined in the appended claims.

What is claimed is:

1. A system for passing a member sealingly through an opening in a wall, comprising a sealing device made of an elastic material, which includes at least one lead-through channel having a smooth inner wall, wherein the sealing device is externally provided with axially spaced-apart, circular, at least substantially inflexible, compressible ribs lying in radial planes, whose outside diameter is larger than the inside diameter of the opening, and wherein the system furthermore includes at least one grommet to be fitted round the member, which grommet can be fitted sealingly in the at least one lead-through channel, characterized in that said grommet has a smooth outer side and a bore whose wall is provided with axially spaced-apart, circular, at least substantially inflexible, compressible ribs lying in radial planes, the bore diameter is at least substantially identical to the outside diameter of the member.

2. The system according to claim 1, wherein the at least one lead-through channels are of at least substantially rectangular cross-section.

3. The system according to claim 1, wherein the at least one grommet comprises a parallelepiped block formed of two identical halves, which halves can be fitted round the member.

4. The system according to claim 1, wherein the smooth inner wall of the at least one lead-through channel abuts against the smooth outer wall of the at least one grommet in the position of use.

5. The system according to claim 1, wherein at least two grommets are used, which can be fitted sealingly in that least one lead-through channel.

6. The system according to claim 5, wherein one of said grommets is a blind grommet.

7. The system of claim 1, wherein the member is a member of the group consisting of a cable, a conduit, and a pipe.

\* \* \* \* \*

UNITED STATES PATENT AND TRADEMARK OFFICE
CERTIFICATE OF CORRECTION

| | | |
|---|---|---|
| PATENT NO. | : 7,005,579 B2 | Page 1 of 1 |
| APPLICATION NO. | : 10/432568 | |
| DATED | : February 28, 2006 | |
| INVENTOR(S) | : Johannes Alfred Beele | |

It is certified that error appears in the above-identified patent and that said Letters Patent is hereby corrected as shown below:

Column 1, line 10, change "whose-outside" to --whose outside--; and

Column 1, line 53, change "Is" to --is--.

Claim 5, column 4, line 19, change "that least" to --the at least--.

Signed and Sealed this

Twenty-eighth Day of November, 2006

JON W. DUDAS
*Director of the United States Patent and Trademark Office*